April 21, 1931.    C. A. VAN DUSEN    1,801,468
FLUID TANK
Filed Aug. 27, 1928    2 Sheets-Sheet 1

INVENTOR
Charles A. Van Dusen
BY
Kwis Hudson & Kent
ATTORNEYS

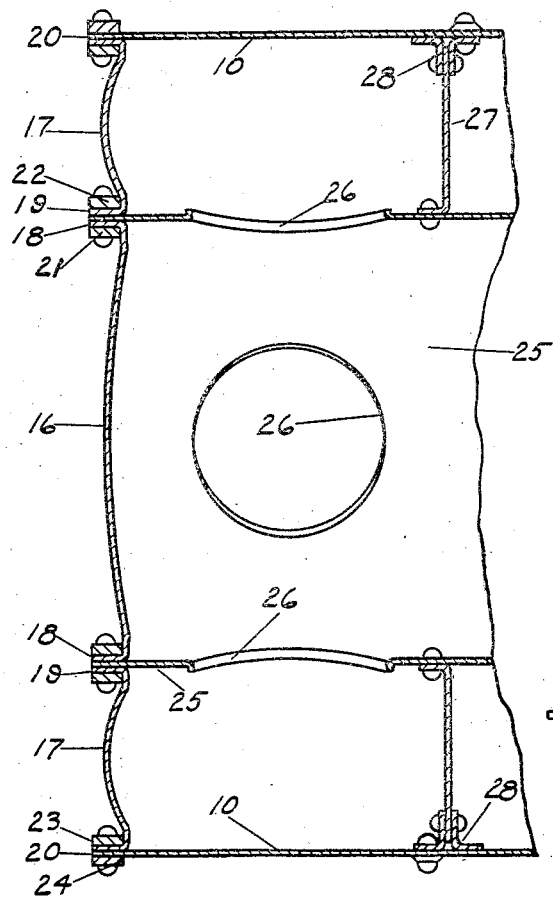
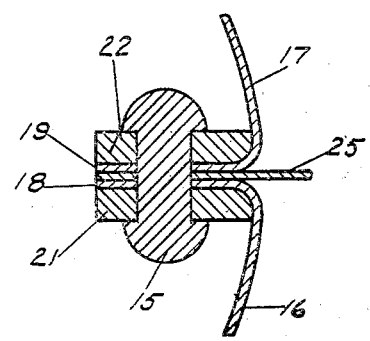
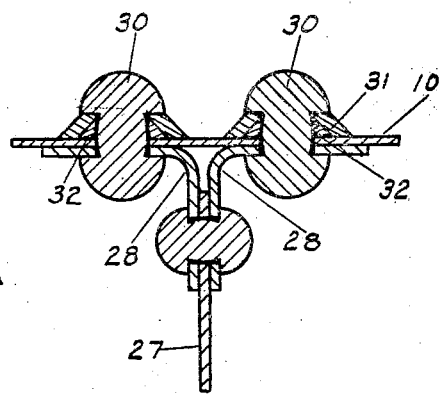
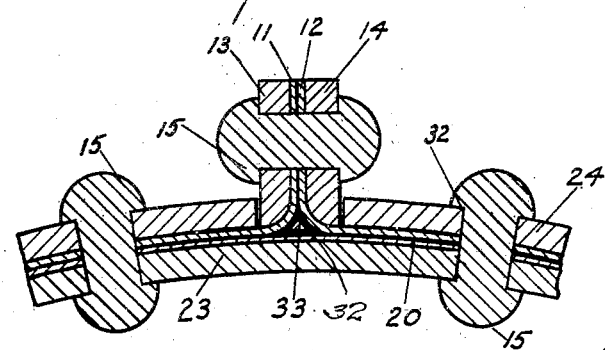

Patented Apr. 21, 1931

1,801,468

UNITED STATES PATENT OFFICE

CHARLES ALBERT VAN DUSEN, OF CLEVELAND, OHIO, ASSIGNOR TO THE GLENN L. MARTIN COMPANY, OF CLEVELAND, OHIO, A CORPORATION OF OHIO

FLUID TANK

Application filed August 27, 1928. Serial No. 302,334.

This invention relates to fluid tanks for use in aircraft or in vehicles where a high strength-weight ratio is essential, and has to do particularly with tanks built of metals or alloys, the nature of which prevents satisfactory welding or soldering of the joints.

Gasoline and oil tanks for use in aircraft have been built heretofore largely of sheet metals, such as brass, copper, terne-plate or tin-plate, which could be soldered, and soldered joints have been employed. The life of such tanks with soldered joints is comparatively short and uncertain at best, since they are subject to frequent failure in service because of the inherently low strength of the solder which must be used. These tanks also have the disadvantage of being much heavier than tanks of similar strength constructed from aluminum or aluminum alloy sheets. Gasoline and oil tanks are also made from commercially pure aluminum sheets with welded seams. These latter tanks, however, are unsatisfactory for the reason that the seams are nothing more nor less than cast metal, which fails in service due to the structural weakness of the metal near the weld.

Many lives have been lost and many valuable planes destroyed on account of fire caused by leakage of gasoline tanks used on aircraft. The provision of tanks which can withstand the effects of vibration and such shocks as may be experienced in landing, etc., without having the seams open up or become materially loosened is therefore a highly important matter.

It has been recognized that if tanks could be constructed from certain aluminum alloys, particularly duralumin, they could be made both light and strong. Duralumin has a strength at least equal to that of terne-plate or tin-plate, about twenty percent greater than that of sheet brass and about fifty percent greater than that of copper.

The use of this material for the purposes stated has not been entirely successful in the past however, owing to the fact that it cannot be soldered or welded.

The riveting of the joints in tanks built of duralumin sheets has also not proven satisfactory prior to my invention. In order to keep down the weight the sheets must be thin. The rivets must be spaced very close together in order to make the joint tight throughout its extent, and the riveting operation as heretofore practiced, must be carried out with extreme care so that the same pressure shall be exerted by all of the rivets upon the plates which they join. Otherwise strains will be set up in the structure and leakage will result sooner or later. Furthermore, the pressure exerted must not be great enough to weaken the rivet or buckle the assembled sheets, and yet it must be sufficient to make a tight joint. Obtaining practically uniform pressure of the correct degree upon all of the rivets with an ordinary riveting tool has been found to be beyond the capability of the average or even unusually skilled operator, and wholly impractical for quantity production under usual manufacturing conditions.

One of the objects of my invention, therefore, is the provision of liquid tight and mechanically strong joints in tanks constructed of duralumin sheets or other sheet metal not readily welded or soldered.

Another object of the invention is to prevent the intermittent buckling in and out of the head portions of thin walled tanks caused by surging of contained liquid, or by alternate increase and decrease of internal pressure on the walls of the tank proportionate to the variable mass of liquid, or by weaving of the supporting structure, and thereby prevent leaks due to cracking as a result of crystallization of the sheet metal.

Another object of the invention is the provision of a tank, capable of quantity production under practical manufacturing conditions, employing riveted joints wherein the rivets are all set with equal pressure and wherein the pressure applied to each rivet is the same on both ends thereof with the result that the lateral expansion of the shanks of the rivets is perfectly symmetrical.

Another object of the invention is the provision of an internal reinforcement of improved form and substantially continuous joints between such reinforcement and the heads of the tank, whereby the breakage of fastenings at these points is eliminated.

A further object of the invention is the reinforcement of the tank at the joints whereby the total pressure brought to bear upon the joint is distributed throughout the extent of the seam uniformly, and whereby a joint is obtained which is just as satisfactory as though the reinforcing strips were omitted and the thickness of the walls of the entire tank increased to equal the thickness of the reinforcing strips plus the thickness of the present wall.

Another object is the provision of a tank having seams so constructed that both ends of their rivets are exposed outside the tank. This permits of rapid and economical manufacture and also permits of easy repair in the event of injury to the tank during the process of manufacture, in shipment, or in service at points remote from shop facilities.

Another object is the provision of means whereby in the event of a seam rivet breaking in two, leakage of contained fluid will not take place from the seam adjacent thereto.

Another object is the provision of reinforcing washers of a peculiar and novel form to be employed in connection with rivets that extend through the tank walls for holding the attaching flanges of filler spouts, drain plugs, reinforcing bulk heads and the like.

Another object is the provision of means for thoroughly sealing the openings left at the ends of the exposed longitudinal joint of the tank, that is the openings between this joint and the ends or heads of the tank.

Another object is to produce a tight mechanical joint between the wall portion of a non-cylindrical tank and the head portion of the tank.

Other objects and features of novelty will appear as I proceed with the description of that embodiment of the invention which, for the purposes of the present application, I have illustrated in the accompanying drawings, in which:

Fig. 3 is a fragmental, longitudinal, sectional view of a tank, having outwardly convexed heads with a combination reinforcing bulk head and baffle member which I have found necessary to meet certain conditions of service.

Fig. 4 is a detailed sectional view on a larger scale illustrating the joint between the internal reinforcing member and one of the heads of the tank.

Fig. 5 is a detailed sectional view taken substantially on line 5—5 of Fig. 1.

Fig. 6 is a detailed sectional view taken substantially on the line 6—6, Fig. 1, illustrating the means I employ for attaching a bulk head to a tank wall; and Fig. 7 illustrates a side and an end of the triangular plug shown in Figs. 2 and 5.

Figure 1:
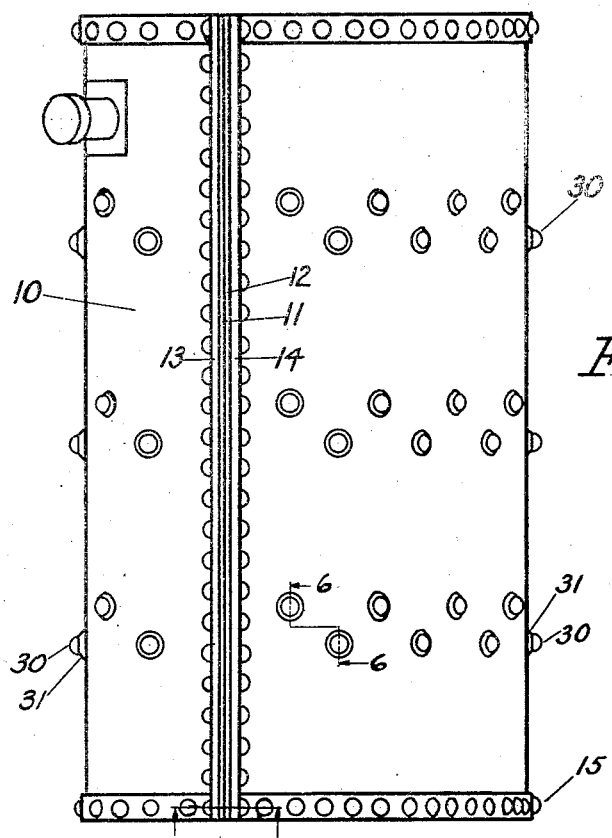
Figure 1 is a side elevation of a tank embodying my invention.
Figure 2:
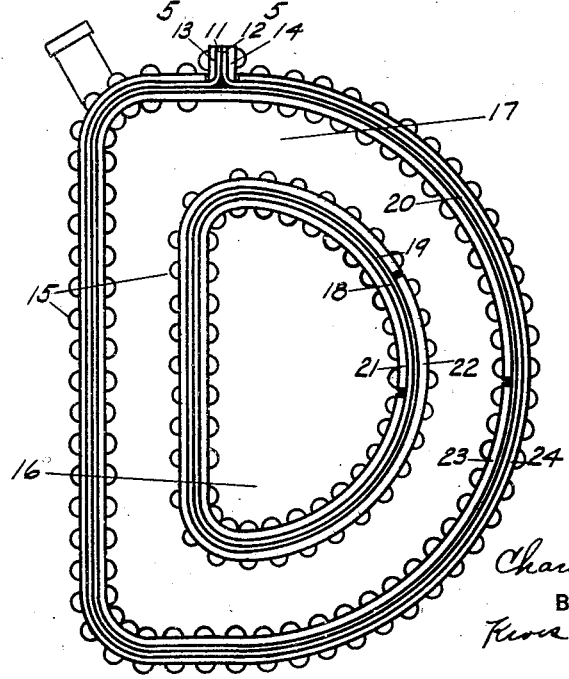
Fig. 2 is an end elevation of the same.

The tank illustrated in the drawings comprises a body portion 10 consisting of a single sheet of relatively thin sheet metal, preferably duralumin. The adjacent longitudinal edge portions of the sheet are turned outwardly to form flanges 11 and 12 which are juxtaposed as shown particularly in Fig. 5. Upon the remote sides of these flanges and extending throughout their length are compression strips 13 and 14, preferably of the same metal as the body portion 10 but of considerably heavier gauge.

After the parts 11, 12, 13 and 14 are assembled in the relation stated, holes are drilled through these parts and rivets 15 set therein. These rivets are of the same material as the strips 13, 14 and the tank itself, as otherwise electrolytic action might be set up. The rivets are set by means of a squeeze riveter, that is, one in which the upsetting force is applied gradually and steadily as well as equally upon both ends of the rivets instead of by a series of blows imparted by a hammer to one end of the rivet while the other end bears against an anvil. The squeezer has a definite pressure which is determined by design or adjustment, and that pressure is then applied to each and every rivet, compressing the strips 13, 14 and the flanges 11, 12 uniformly throughout their lengths, and expanding the shanks of the rivets laterally in a uniform symmetrical manner well illustrated in the drawings. A hammered rivet on the other hand would be compressed in proportion to the number of hammer blows applied to it and the lateral expansion which accompanies the compression would not be symmetrically distributed throughout the length of the shank of the rivet, with the result that leakage around one end of the rivet would be more apt to occur than around the other end thereof.

Squeeze riveters are not broadly new, but their use in small size portable hand tools has heretofore been practically unknown so far as I am aware and their employment for producing uniform symmetrical rivets in riveted fluid tanks in order to equalize the pressures throughout the extent of a seam or joint in such tanks is an important feature of my invention. The close spacing apart of squeezed rivets 15 in cooperation with the clamping action of strips 21—22, 23—24 each of which is quite thick as compared to tank walls 10 and 17, insures a tight seam in the event of a broken rivet.

In the present instance the heads of the tanks are formed of a central plate 16 and a surrounding D-shaped plate 17. Both plates 16, 17 are outwardly convexed between their flanged edges and are inset with respect to the walls of the body portion 10 of the tank, the plate 16 having an outwardly extending flange 18 throughout its periphery, and the plate 17 having outwardly extending flanges 19 and 20 along its inner and outer peripheries respectively. On the remote side of the flanges 18, 19 there are reinforcing strips 21, 22. A similar strip 23 bears against the inner side of flange 20 on the plate 17 and a reinforcing strip 24 bears upon the outer side of the body portion 10 opposite the flange 20. The joint between the plates 16 and 17 and the joint between the plate 17 and body portion 10 are completed by means of further rivets 15 applied as above explained.

All of the joints are preferably fabricated with a suitable sealing compound applied before the riveting takes place, and the compression of the joint due to riveting, of course, forces this compound into all of the interstices of the joint including such portions of the rivet holes as are not completely filled by the lateral expansion of the rivets.

Within the tank, particularly if it is one of rather large size, I prefer to employ a reinforcing cylinder 25, lightened by a series of holes 26, the edges of which are flanged for strength. The ends of this cylinder extend through the heads of the tank between the flanges 18, 19 thereof, as illustrated particularly in Fig. 4. At intervals throughout the length of the tank the cylinder 25 is connected with the periphery of the tank by D-shaped bulk heads 27, the inner peripheries of which are flanged and riveted to the cylinder as indicated in Fig. 3. Riveted to the outer periphery of each of the bulk heads 27 there is a pair of oppositely extending angle bars 28 which engage the inner walls of the body portion 10 of the tank.

These angle bars are secured to the walls of the tank by staggered rivets 30 which may be identical with the rivets 15 or different therefrom in size only. Outside the tank wall and under the heads of the rivets 30 I employ resilient sealing washers 31 of a special form. They are preferably, although not necessarily, tapered upon their outer sides, and the hole of each washer is countersunk as shown. I fill these counter-sinks around the shanks of the rivets 30 with a sealing compound 32 which is of a plastic nature and preferably remains so indefinitely. It is impervious to the fluids which the tank is designed to hold, and is insoluble therein. These counter-sunk recesses in the washers serve a double purpose, first to retain a considerable part of the sealing material, that which may be forced out by the process of riveting being more or less confined in the seams, and second to act as a cushion to relieve excessive strains produced by the riveting operations, the remaining tension being within the elastic limit of the metal. Washers without such recesses would permit riveting strains which might eventually cause breakage of the rivet, obviously followed by leakage and the possibility of fire.

The reinforcing cylinder 25, attached to the heads of the tank between the flanges 18 and 19, has a double purpose in that it restricts the movement of the contained fluid and contributes in a marked degree to the rigidity of the heads. It has been demonstrated in practice that this construction is effective in providing the necessary structural rigidity of the tank as a whole and contributes to insurance against cracking of the thin sheet metal required to be used for the purpose. The assembling of the outer shell and the two sections of each head with the reinforcing cylinder 25 projecting outwardly through the joint between the head sections and before the progressive drilling and riveting of the seam 18, 19, 21, 22 effectually prevents the incorporating of destructive strains in the completed head.

It has been demonstrated in practice that this construction is one of the most effective means of providing the necessary light-weight high-strength features, as it forms a convenient continuous attachment of the reinforcement to the tank head and prevents concentration of the load at any given point. This minimizes the effect of reversal of stress (buckling) and thereby prevents fatigue in the metal.

By this construction I also obtain a convenient means of access to the interior of the tank in the event it is necessary to repair same, as the end bulkheads of the tank are made in two sections—an inner plate and an outer annular plate. The inner plate only need be completely removed to permit access to the longitudinal reinforcing cylinder which is provided with lightening holes. These lightening holes permit access to the interior fastenings and make it possible to conduct repairs even in remote corners of the tank, by simply removing the end plate of the reinforcing cylinder.

The rivet seam which attaches the reinforcing cylinder 25 to the two sectioned head is of the same exposed construction as the other exterior seams on the tank, which makes it possible to open the tank and reseal it without disturbing any of the otherwise inaccessible attachments to the interior structure.

Aluminum alloy rivets, when required, are preferably heated to a softening temperature and allowed to cool, but they must be headed over before the natural hardening takes place within a comparatively short interval of time after cooling.

After the tank is assembled and all of the rivets are set, I drive an aluminum plug 33 of substantially triangular cross section into each end of the tank between the flange 20 of the head and the curved bends at the bases of the flange 11 and 12. The fit of the plug 33 must be close enough to completely fill this space and to prevent the plug from becoming dislodged or loosened during the use of the tank, therefore slightly concaved sides are provided at 34. At 35 is shown a groove to retain compound 32.

While this invention was primarily brought about by the demand for satisfactory tanks for aircraft use, it is not necessarily confined entirely to such use nor is the invention necessarily applicable to aluminum, or aluminum alloy tanks alone. The nature of the invention is such that it may be used for tanks for other than aircraft purposes where metals are employed which cannot be soldered satisfactorily, or where other requirements make it advisable to use this type of construction, as for example in tanks for motor busses where weight saving is an important consideration.

Having thus described my invention, I claim:

1. A sheet metal tank having a body portion and a head, said body portion having a longitudinal seam comprising outwardly extending flanges on the meeting edges of the body portion; rivets extending through said flanges; said heads being inset and having an outwardly extending peripheral flange engaging the body portion; rivets extending through said body portion and last named flange to form an end joint; and a plug of substantially triangular cross-section filling the space between said longitudinal seam and said peripheral flange.

2. A sheet metal tank having a body wall portion and heads; said body portion having a longitudinal seam comprising outwardly flanged portions of said walls in intimate face to face relation; compression strips on the remote sides of said flanges; each head of said tank being inset and having an outwardly extending peripheral flange intimately engaging the body portion; a compression strip on the inner side of each of said flanges; a compression strip on the outside of said body wall adjacent each of said flanges; progressively spaced rivets for retaining said compression strips and portions of said body wall and heads in said intimate face to face relation; and a driven plug filling the space between said longitudinal seam and said peripheral flange at each end of said tank.

3. In a sheet metal tank for the storage of fluids, a member to be attached to a wall of said tank, said member comprising a portion lying against said wall, said portion and tank wall having registering openings therein; a rivet extending through said openings, a washer surrounding said rivet, the opening through said washer being counter-sunk on one side; and a viscous non-hardening sealing compound in the counter-sunk portion of said opening.

4. A sheet metal tank; rivets mounted in said tank; washers under the heads of the rivets, each washer being recessed on one side around the hole therethrough; said recesses containing a non-hardening viscous sealing material.

5. A sheet metal fluid tank; rivets mounted in said tank; washers inside the heads of the rivets, each washer being recessed on one side around the hole therethrough; said recesses containing a non-hardening plastic material insoluble in the fluid to be stored in the tank.

6. In a light gauge sheet metal tank, a body portion; a reinforcing cylinder within said body portion extending from one end thereof to the other; heads for the ends of said tank, each head comprising an inner plate secured to the adjacent end of the reinforcing cylinder and an outer annular plate secured to the adjacent end of said cylinder and to the adjacent end of said body portion.

7. In a light gauge sheet metal tank, a body portion; a reinforcing cylinder within said body portion extending from one end thereof to the other; means intermediate the ends of said tank for securing said cylinder to the body portion of said tank in spaced relation therewith; heads for the ends of said tank, each head comprising an inner plate secured to the adjacent end of the reinforcing cylinder and an outer annular plate secured to the adjacent end of the cylinder and to the adjacent end of the body portion.

8. In a light gauge sheet metal tank, a body portion; a reinforcing cylinder within said body portion extending from one end thereof to the other, said cylinder having openings therethrough permitting free communication within the tank between the interior and exterior of the cylinder while restricting the flow of fluid due to sudden movements of the tank; heads for the ends of the tank, each head comprising an inner plate secured to the adjacent end of the reinforcing cylinder, and an outer annular flange secured to the adjacent end of the cylinder and to the adjacent end of the body portion.

9. A sheet metal tank having a body portion and heads of irregular contour, said heads having flanged edges and surfaces formed to double curvature convexed in the direction of said flanges and outwardly in relation to said tank, said heads in set and engaging said body portion; compression strips extending along the remote surfaces of the elements comprising the joint between said body portion and said flanges; said strips and the engaging portions of said heads and said body held together by consecutively set rivets whereby the elements comprising the joints are consolidated.

10. A thin sheet metal tank, bulkheads within said tank, said bulkheads flanged around their outer circumference and contacting with the walls of said tank; recessed washers on the outer surface of said tank, said recesses filled with plastic sealing material, rivets thru said flanges said tank wall and said washers, the heads of said rivets set against said flange and said recessed washer whereby a liquid tight joint is secured.

11. A thin sheet metal tank; bulkheads within said tank, said bulkheads flanged around their outer circumference and contacting with the walls of said tank; recessed washers on the outer surface of said tank, said recesses filled with plastic sealing material; rivets through said flanges said tank wall and said washers, the heads of said rivets set against said flange and said recessed washer whereby undue stress upon the body and heads of said rivets is prevented.

12. A thin sheet metal tank having a body wall portion and heads; said body portion having a longitudinal seam comprising outwardly flanged portions of said walls compressed into intimate face to face relation by comparatively thick compression strips on the remote sides of said flanges; each head of said tank being inset and having an outwardly extending peripheral flange compressed into intimate face to face relation with portions of said body wall by comparatively thick compression strips; said strips, said body flanges, and said head flanges retained in said relation by closely spaced rivets progressively set; a driven plug filling the substantially triangular space adjacent the end of said side seam and said head flange, said plug having a lateral groove in each side thereof intermediate the ends, and sealing material in said grooves.

13. A sheet metal tank wall having a longitudinal joint comprising outwardly extending flanges on the meeting edges of said wall; compression strips extending longitudinally along said joint on the remote sides of said flanges; a consecutive series of rivets extending through said flanges and strips; said rivets having been placed by starting at some single rivet and progressively set in either direction from the first rivet whereby the elements comprising said joints are consolidated.

14. A sheet metal tank wall having a longitudinal joint comprising outwardly extending flanges on the meeting edges of said wall; compression strips extending longitudinally along said joint on the remote sides of said flanges; a consecutive series of heat treated aluminum alloy rivets extending through said flanges and strips; said rivets having been placed by starting at some single rivet and progressively set in either direction from the first rivet while in a soft state whereby the elements comprising said joints are consolidated.

15. A sheet metal tank having a head; said head being inset and having an outwardly extending flange engaging the wall of said tank to form a joint; compression strips extending along the remote side of said wall contiguous with said head flange; a consecutive series of rivets extending through said head flanges, wall, and strips; said rivets having been placed by starting at some single rivet and progressively set in either direction from the first rivet whereby the elements comprising said joint are consolidated.

16. A sheet metal tank having a head; said head being inset and having an outwardly extending flange engaging the wall of said tank to form a joint; compression strips extending along the remote side of said wall contiguous with said head flange; a consecutive series of heat treated alumium alloy rivets extending through said head flanges, wall, and strips; said rivets having been placed by starting at some single rivet and progressively set in either direction from the first rivet while in a soft state whereby the elements comprising said joint are consolidated.

17. A sheet metal tank having a body portion and head portions; said body portion having a longitudinal joint comprising outwardly extending flanges on the meeting edges of the body portion; compression strips extending longitudinally along said joint on the remote sides of said flanges; said heads being inset and having outwardly extending flanges engaging said body portion to form a joint; compression strips extending along the remote surfaces of said body portion contiguous with said head flanges; a consecutive series of rivets extending through said wall portions and strips; a consecutive series of rivets extending through said head flanges and strips; said rivets having been placed by starting at some single rivet and progressively set in either direction from the first rivet whereby the elements comprising said joints are consolidated.

18. A sheet metal tank having a body portion and heads, said heads having flanged edges and surfaces formed to double curvature convexed in the direction of said flanges and outwardly in relation to said tank, said convexed heads inset and engaging said body portion; compression strips extending along the joint between said body portion and said flanges on the remote surfaces of said body portion and said head flanges; a series of rivets extending through said wall portions, flanges and strips, said rivets having been put in place by starting at some single rivet and progressively setting up the rivets in either direction from the first rivet whereby the elements comprising the joints are consolidated.

19. A sheet metal tank having a body portion and a head, said body portion having a longitudinal joint comprising outwardly extending flanges on the meeting edges of the body portion; rivets extending through said flanges; said heads being inset and having an outwardly extending peripheral flange engaging the body portion; rivets extending through said body portion and last named flange to form an end joint; a plug of substantially triangular cross-section filling the space between said longitudinal seam and said peripheral flange, said plug coaxially slotted intermediate its ends.

20. A sheet metal tank having a body portion and a head, said body portion having a longitudinal joint comprising outwardly extending flanges on the meeting edges of the body portion; rivets extending through said flanges; said heads being inset and having an outwardly extending peripheral flange engaging the body portion; rivets extending through said body portion and last named flange to form an end joint; a plug of substantially triangular cross-section filling the space between said longitudinal joint and said peripheral flange, said plug coaxially slotted intermediate its ends, said slot containing a viscous sealing material.

21. A sheet metal tank; rivets headed inside and outside a wall of said tank; a washer under a head of said rivets; said washer recessed on one side around the hole therethrough, viscous sealing material in said recess.

22. A sheet metal tank; aluminum alloy heat treated rivets mounted in said tank; a washer under a head of each rivet, said washers being recessed on one side around the hole therethrough, said recesses containing a viscous sealing material, and said rivets set while in a soft state.

23. In a sheet metal tank, a body portion and heads, each head comprising an outer annular portion and a flanged inner portion; said outer portion flanged in relation to said body portion and to the flange of said inner portion; a compression strip on said body portion adjacent said flange; a compression strip on the inner side of the outer flange of said outer portion; a compression strip on each of the remote sides of the contiguous flanges of said head portions; a series of rivets extending through said outer strip, said wall portion, said outer flange of said outer head portion and the contiguous compression strip; a series of rivets extending through contiguous flanges of said heads and the contiguous compression strips; said rivets having been put in place by starting at some single rivet and progressively setting up the rivets in either direction from the first rivet whereby the elements comprising the joints are consolidated.

24. A sheet metal tank having a body portion and a head portion; said body portion having a longitudinal joint comprising outwardly extending flanges on the meeting edges of the body portion; compression strips extending longitudinally along said joint on the remote sides of said flanges; said heads being inset and having outwardly extending flanges engaging said body portion to form a joint; a compression strip extending along the remote surface of said body portion contiguous with said head flange, the ends of said strip abutting said longitudinal strips; a compression strip extending along the inner surface of said head flange contiguous with said body portion, the ends of said strip abutting each other; a consecutive series of rivets extending through said wall portions and strips; a consecutive series of rivets extending through said head flanges and strips; said rivets having been placed by starting at some single rivet and progressively set in either direction from the first rivet whereby the elements comprising said joints are consolidated.

In testimony whereof, I hereunto affix my signature.

CHARLES ALBERT VAN DUSEN.